US008714091B2

(12) United States Patent
Kobayashi et al.

(10) Patent No.: US 8,714,091 B2
(45) Date of Patent: *May 6, 2014

(54) GAS GENERATOR

(71) Applicant: Daicel Corporation, Osaka (JP)

(72) Inventors: Tomoharu Kobayashi, Tatsuno (JP);
Masayuki Yamazaki, Tatsuno (JP);
Shinichiro Ukita, Tatsuno (JP)

(73) Assignee: Daicel Corporation, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/794,120

(22) Filed: Mar. 11, 2013

(65) Prior Publication Data
US 2013/0255529 A1 Oct. 3, 2013

Related U.S. Application Data

(60) Provisional application No. 61/619,729, filed on Apr. 3, 2012.

(30) Foreign Application Priority Data

Apr. 2, 2012 (JP) .................................. 2012-83534

(51) Int. Cl.
C06D 5/00 (2006.01)
B60R 21/26 (2011.01)

(52) U.S. Cl.
USPC ...................................................... 102/530

(58) Field of Classification Search
USPC .................. 280/736, 741; 102/530
See application file for complete search history.

(56) References Cited

U.S. PATENT DOCUMENTS

| 5,503,806 A | * | 4/1996 | Fulmer et al. | ................. 422/164 |
| 5,582,427 A | * | 12/1996 | Rink et al. | ................. 280/740 |
| 5,613,705 A | * | 3/1997 | Hock et al. | ................. 280/741 |
| 6,032,979 A | * | 3/2000 | Mossi et al. | ................. 280/741 |
| 6,234,521 B1 | | 5/2001 | Katsuda et al. | |

(Continued)

FOREIGN PATENT DOCUMENTS

| EP | 1 669 258 A1 | 6/2006 |
| JP | 10-95303 A | 4/1998 |
| JP | 2005-199867 A | 7/2005 |

OTHER PUBLICATIONS

International Search Report and Written Opinion issued in International Application No. PCT/JP2013/057331 on Jun. 5, 2013.

*Primary Examiner* — Toan To

(74) *Attorney, Agent, or Firm* — Birch, Stewart, Kolasch & Birch, LLP

(57) ABSTRACT

A gas generator includes, a housing integrated at an upper circumferential wall plate and a lower circumferential wall plate, an ignition device chamber defined by a cup-shaped container disposed at a bottom plate of the housing, a combustion chamber surrounding the ignition device chamber, an annular filter facing a top plate of the housing, and a retainer supporting the filter and including an annular bottom surface supporting a lower surface of the filter and a cylindrical wall surface being press-fitted directly or indirectly to a circumferential wall plate of the housing. A circumferential wall of the cup-shaped container in the vicinity of the bottom surface abuts against or is positioned close to an inner circumferential surface of the filter. During activation, when the housing deforms, the annular filter gas-tightly attaches to the top plate of the diffuser shell, and a combustion gas is discharged radially outward through the filter.

12 Claims, 2 Drawing Sheets

(56) References Cited

U.S. PATENT DOCUMENTS

| | | | |
|---|---|---|---|
| 7,267,365 B2 * | 9/2007 | Quioc | 280/736 |
| 7,806,954 B2 * | 10/2010 | Quioc | 55/385.3 |
| 7,883,111 B2 * | 2/2011 | Blessing et al. | 280/741 |
| 2004/0061319 A1 * | 4/2004 | Saso et al. | 280/741 |
| 2005/0151357 A1 | 7/2005 | Yamazaki | |
| 2005/0161924 A1 * | 7/2005 | Schoenhuber et al. | 280/741 |
| 2005/0200107 A1 * | 9/2005 | Matsuda et al. | 280/741 |
| 2006/0119087 A1 | 6/2006 | Blessing et al. | |
| 2007/0046005 A1 * | 3/2007 | Hanano et al. | 280/736 |
| 2007/0222195 A1 * | 9/2007 | Yabuta et al. | 280/740 |
| 2007/0273132 A1 * | 11/2007 | Smith et al. | 280/736 |

\* cited by examiner (a)

(b)

(c)

GAS GENERATOR

This nonprovisional application claims priority under 35 U.S.C. §119(a) to Patent Application No. 2012-83534 filed in Japan on 2 Apr. 2012 and 35 U.S.C. §119(e) to U.S. Provisional application No. 61/619,729 filed on 3 Apr. 2012, which are incorporated by reference.

BACKGROUND OF INVENTION

1. Field of Invention

The present invention relates to a gas generator suitable for a restraining device such as an airbag apparatus.

2. Description of the Related Art

In a gas generator used in a restraining device such as an airbag apparatus, various components and a gas generating agent are accommodated inside a housing forming an outer shell, and it is important to reduce the number of components and simplify the assembling process, while maintaining the high quality of the gas generator.

In the inflator shown in FIG. 1 of U.S. Pat. No. 5,582,427, a gas generating agent 30 is disposed in the lower side of a gas generating chamber 28 inside a housing, and a filter 34 is disposed in the upper side, facing an exit port 40. The housing 12 has a double-tube structure formed by an tubular outer wall 16 and an tubular inner wall 18 which are connected to a top wall 20 and a bottom wall 14, respectively.

The upper end of the filter is abutted against the top surface of the housing, and a seal 42 is arranged at the lower end to seal against gas flows. The outer circumferential edge (a leg 50) of the seal 42 is elastic. Further, in the leg 50, the distal end of the leg 50 is fitted into a groove formed in the housing wall, so that a pressing force is applied to the filter toward the top surface side, thereby sealing the upper and lower ends of the filter.

In the gas generator shown in FIG. 10 of JP-A No. 10-95303, a filter 307 is disposed in the vicinity of a gas discharge port 311 of a diffuser shell 301, and a gap 309 is formed.

The inner circumferential surface of the filter 307 is held by a plate member 332, and the lower surface thereof is held by a plate member 333.

The plate member 333 is press-fitted to the inner circumferential surface of the diffuser shell 301. The lower end of the plate member 333 is abutted against an inclined surface 331 of a closure shell 302 and holds a filter 307.

U.S. Pat. No. 7,806,954 discloses a gas generator 10 shown in FIG. 1.

Unlike the gas generators disclosed in U.S. Pat. No. 5,582,427 and JP-A No. 10-095303, a first housing portion 22 and a second housing portion 24 are joined to each other only at circumferential walls thereof.

A baffle assembly 12 is disposed inside the housing, and a filter retainer 50 is included therein. As a result, the gas generated from a gas generating composition 38 is guided by a zigzag gas discharge path to an apertures 28. An annular member 55 is welded to a booster tube 30, and the filter retainer 50 is also welded to the annular member 55.

SUMMARY OF INVENTION

The prevent invention provides a gas generator, including:
a housing including,
a diffuser shell having a top plate and an upper circumferential wall plate provided with a gas discharge port, and
a closure shell having a bottom plate and a lower circumferential wall plate,
the housing, forming an outer shell, being obtained by joining and integrating the upper circumferential wall plate and the lower circumferential wall plate;
an ignition device chamber provided within the housing and defined by a cup-shaped container that is disposed in a central part at the bottom plate of the closure shell, and accommodates an ignition device therein;
a combustion chamber defined to surround the ignition device chamber and charged with a gas generating agent;
an annular filter disposed to face the top plate;
a retainer supporting the annular filter and including,
an annular bottom surface supporting at least a portion of a lower surface of the annular filter, and
a cylindrical wall surface extending at least in an axial direction of the housing from an outer circumferential edge of the annular bottom surface, the cylindrical wall surface being fixed by being press-fitted directly or indirectly to a circumferential wall plate formed by the upper circumferential wall plate and the lower circumferential wall plate;
a combustion gas passage formed to pass through from an outer circumferential surface of the filter to the gas discharge port;
the cup-shaped container being disposed such that a bottom surface thereof abutting against or being positioned close to the top plate of the diffuser shell, a circumferential wall thereof in the vicinity of the bottom surface abutting against or being positioned close to an inner circumferential surface of the annular filter,
during activation,
when the housing deforms in the both directions of the top plate of the diffuser shell and the bottom plate of the closure shell, the retainer and the annular filter move such that the annular filter is in gas-tight contact with the top plate of the diffuser shell, a combustion gas passes through the combustion gas passage to be discharged from the gas discharge port after passing radially outward through the annular filter.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
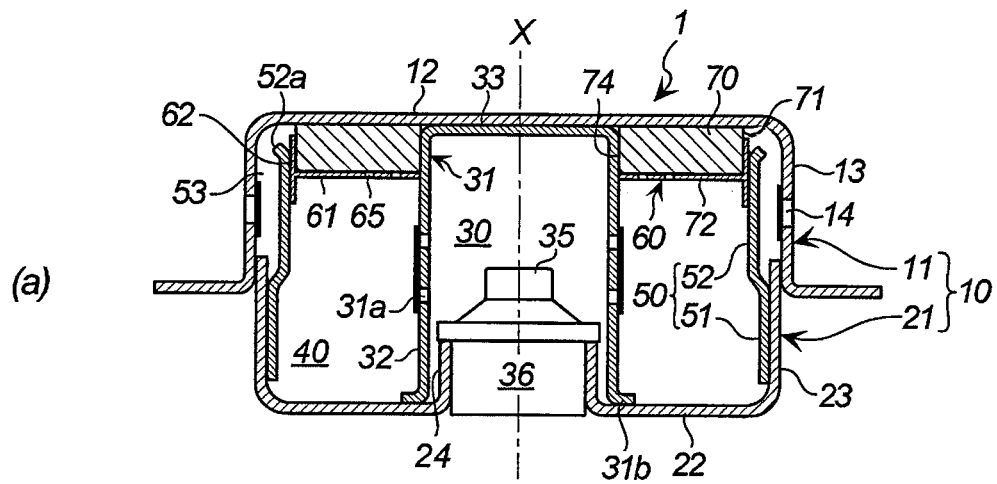
FIG. 1 shows, in (a), a cross-sectional view along the axis X of the gas generator before the actuation, in (b), a perspective view showing a state in which the annular filter is supported by the retainer (a state is shown in which part is cut out), and, in (c), a state after the actuation of the gas generator shown in (a)
Figure 1:
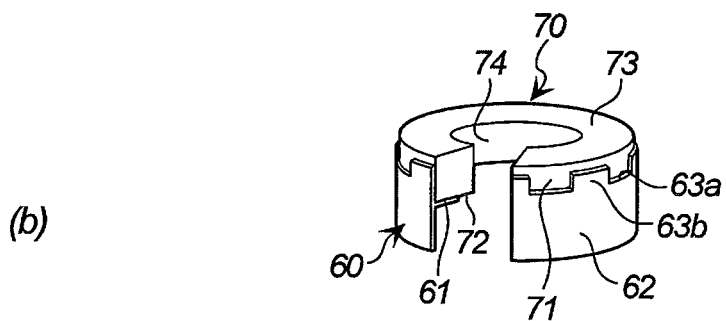
Figure 1:
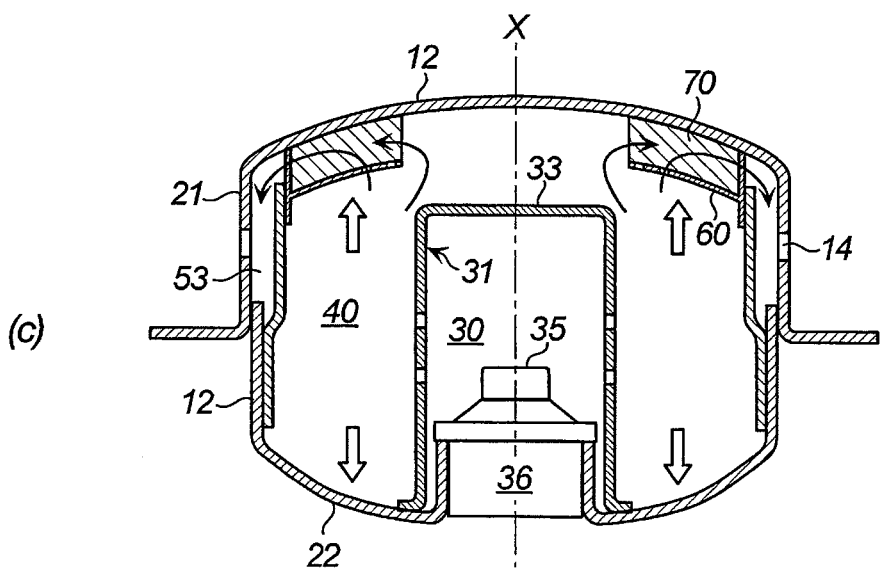

As described hereinabove, in U.S. Pat. No. 5,582,427, the leg 50 is fixed in the groove to seal the upper and lower end surfaces of the filter. Therefore, when the housing is deformed in the vertical direction in the drawing during actuation, a gap appears between the seal 42 and the filter 34 and short-passing can be occurred such that the combustion gas passes through this gap and is discharged from the exit port 40, without passing through the filter.

Further, it is difficult to adjust the insertion position of the seal 42 according to a charged amount of the gas generating agent and a thickness of the filter.

When the diffuser shell 301 and the closure shell 302 are deformed in the vertical direction in the drawing of JP-A No. 10-95303 during actuation, a gap appears between plate member 333 and the filter 307, and short-passing can be occurred such that the combustion gas passes through this gap and is discharged from the gas discharge port 311, without passing through the filter.

Further, because the lower end of the plate member 333 is abutted against the inclined surface 331, in some cases it may be difficult to compensate the gap due to the change of a filter thickness.

Since the housing is formed by welding only the circumferential walls, in U.S. Pat. No. 7,806,954, a first housing portion 22 and a second housing portion 24 are easily deformed in the axial direction during actuation, and a gap is easily formed between the top plate of the first housing portion 22 and a filter 60 at this time.

Further, none of the structures described in the above patent documents changes the gas inflow surface of the filter when the combustion gas enters the filter, without occurrence of short-passing of the combustion gas. And there is a room for improvement in the above, in view of suppressing a difference in output caused by a difference in ambient temperature.

The present invention provides a gas generator suitable for a restraining device or the like, in which an internal structure and an assembling process is simplified, no short-passing of the combustion gas occurs even when a housing is deformed by pressure during actuation, and a difference in output, caused by a difference in ambient temperature where the gas generator is present during actuation, is reduced.

The present invention provides a gas generator which is assembled easily, and that exhibits high performance.

In a housing, an annular filter is supported by a retainer and disposed to abut against a portion of a cup-shaped container. During actuation, the housing deforms towards the both of a top plate and a bottom plate, and the retainer and the annular filter move to be pressed against the top plate. At that time, combustion gas passes through the annular filter, then, passes through a combustion gas passage at a cylindrical wall surface of the retainer, and finally is discharged from a gas discharge port.

In the gas generator in accordance with the present invention, when the housing is deformed due to the increase in internal pressure during the actuation, the retainer and the annular filter held thereby are deformed in a similar manner. As a result, the gas inflow surface in the filter is increased for the combustion gas when the gas generator is actuated, while preventing short-passing through which the combustion gas is discharged from the gas discharge port, without passing through the annular filter. Thereby, the difference in output caused by the difference in ambient temperature during the actuation of the gas generator is reduced.

The annular filter is disposed so as to face the top plate of the diffuser shell.

Before the gas generator is actuated, the annular filter may be disposed so as to abut directly against the top plate, or a sheet-shaped gasket or a seal member may be interposed therebetween, or a small gap may be provided therebetween.

A preferable annular filter is made of iron, steel or stainless steel material wire wound in the circumferential direction (wound-type), a perforated steel sheet (expanded metal or punched metal type), compression-molded knitted steel wire (knitted mesh type), a plurality of wire mesh sheets punched into an annular shape and laminated, or a wire mesh wound in the circumferential direction. A wire material, a wire diameter, a compression-molding pressure, a density, the number of laminating layers and a thickness are preferably adjusted such that when the filter is disposed inside the housing, deformation degree of the filter in the axial direction of the center side is larger than of the circumferential edge side.

The retainer has the annular bottom surface and the cylindrical wall surface.

The annular bottom surface of the retainer can be formed to have an inner diameter larger than the outer diameter of the cup-shaped container. The annular bottom surface separates, in the axial direction (vertically), a space where the filter is disposed from a space (the combustion chamber) charged with the gas generating agent. The inner circumferential edge of the annular bottom surface of the retainer is arranged opposite the outer circumferential surface of the cup-shaped container, and at least a gap is formed therebetween. The shape of the gap is not particularly limited, and any shape that allows the combustion gas to pass through and flow into the filter can be used.

The cylindrical wall surface of the retainer extends in the axial direction of the housing from the outer circumferential edge of the annular bottom surface. Therefore, the cylindrical wall surface may extend toward the top plate of the diffuser shell and may extend toward the bottom plate of the closure shell. The height of the cylindrical wall surface in the case where the cylindrical wall surface extends toward the top plate of the diffuser shell, can be such that the upper end of the annular filter slightly protrudes from the upper end of the cylindrical wall surface when the annular filter is disposed on the annular bottom surface before the gas generator is actuated.

The retainer is fixed by being directly or indirectly press-fitted to the circumferential wall plate of the housing, and no fixing means, such as welding, is used therefor.

When the retainer is indirectly press-fitted to the circumferential wall plate, for example, the other member is fixed to the circumferential wall plate (for example, press-fitted and fixed), and then the retainer is press-fitted and fixed to the other member.

The retainer is preferably made of a ductile metal, for example, stainless steel, iron, or aluminum. In particular, a material or dimensions of the retainer are adjusted such that the annular bottom surface is deformed by the pressure in the combustion chamber when the gas generator is actuated and such that the annular filter can be gas-tightly attached to the top plate of the diffuser shell by using the elasticity thereof. Furthermore, the cylindrical wall surface is directly or indirectly press-fitted to the circumferential wall plate, but when the gas generator is actuated, the retainer may move together with the annular filter toward the top plate of the diffuser shell, and in such a case, it is preferred that the dimensions or a thickness of the retainer be adjusted such that a degree of press-fitting enables the movement under the pressure during the actuation.

The annular filter is supported by the retainer, but is not fixed and attached to the retainer.

At least part of the lower surface of the annular filter is supported by the annular bottom surface of the retainer.

A shape of the annular bottom surface of the retainer is such that the retainer can be abutted against and support the lower surface of the annular filter.

When the cylindrical wall surface of the retainer extends toward the top plate of the diffuser shell, the shape thereof is such that the cylindrical wall surface can be abutted against and support the outer circumferential surface of the annular filter and also such that the cylindrical wall surface can be fixed to the circumferential wall plate of the housing by being directly or indirectly press-fitted thereto. The outer circumferential surface of the annular filter is disposed at a distance to the gas discharge port (the circumferential wall plate of the housing) so that a gap is provided for the distance, forming the combustion gas passage.

The housing is integrated by joining at the circumferential edge of the opening of the diffuser shell and the circumferential edge at the opening of the closure shell.

Although the opening of the cup-shaped container is fixed by a method such as welding to the bottom plate of the closure shell, the bottom surface of the cup-shaped container and the top plate of the diffuser shell are not fixed.

The cup-shaped container is disposed such that the bottom surface thereof is abutted against or positioned close to the top plate of the diffuser shell, and the circumferential wall in the vicinity of the bottom surface of the cup-shaped container is abutted against or positioned close to the inner circumferential surface of the annular filter.

The term "abutted" used herein means a state in which two surfaces are in contact, but not attached tightly to each other, and the term "positioned close" means a state in which two surfaces face each other at a distance of about equal to or less than several millimeters from each other (for example, at a close distance of about 1 mm to 3 mm).

Where the cup-shaped container is disposed such that the bottom surface thereof is abutted against or positioned close to the top plate or the inner circumferential surface of the annular filter, the operations of positioning and mounting the annular filter during the assembling are facilitated, regardless of a shape of the retainer.

A total opening surface area of the gas discharge port can be set less than the cross section area of the combustion gas passage formed at the outer circumferential surface of the filter or the cross section area of the gap between the annular bottom surface of the retainer and the cup-shaped container.

When the gas generator is actuated, the central portion of the top plate and the central portion of the bottom plate undergo the largest deformation in the axial direction, and the degree of deformation decreases toward the circumferential wall plate side.

In this case, since the degree of deformation of the retainer and the annular filter increases toward the central portion, the state in which the upper surface of the annular filter abuts against the top plate of the housing, and the lower surface abuts against the bottom surface of the retainer is maintained. Therefore, short-passing, through which the combustion gas is discharged from the gas discharge port, without passing through the annular filter, is prevented.

Further, when the housing is deformed, the bottom surface of the cup-shaped container is away form the top plate of the diffuser shell and a gap is formed therebetween. The inner circumferential surface of the annular filter faces this gap (the inner circumferential surface of the annular filter is no more abutted against nor positioned close to the circumferential wall of the cup-shaped container).

In other words, the inner circumferential surface of the annular filter becomes the combustion gas inflow surface. Such a deformation of the housing depends on an internal pressure during the combustion (a pressure inside the housing).

When the internal pressure is high (for example, when the ambient temperature during the actuation is high), a burning rate is also high and the output of the gas generator increases.

However, when the housing is deformed by a high internal pressure, the gas inflow surface (the inner circumferential surface facing the above gap) of the inner circumferential surface of the filter also increases and the contact surface area with the combustion gas increases, thereby increasing the cooling efficiency. Accordingly, the output of the gas generator is suppressed. In other words, the gas generator is provided in which the difference in output caused by the difference in ambient temperature becomes small by comparison with that in the conventional gas generator.

Since the outer circumferential surface of the annular filter faces the gas discharge passage including the gas discharge port for discharging the gas generated in the combustion chamber toward the outside of the housing, the combustion gas flows radially outside in the annular filter and is discharged from the outer circumferential surface of the annular filter to the outside of the combustion chamber.

The ignition device may include only a conventional electric igniter, or may additionally include priming such as a transfer charge or a gas generating agent.

A preferable feature 1 of the present invention provides a gas generator, wherein the cylindrical wall surface of the retainer extends toward the top plate of the diffuser shell, and a depression and a protrusion are provided in the circumferential direction at a circumferential edge thereof;

when the housing is deformed toward both the top plate of the diffuser shell and the bottom plate of the closure shell and the retainer and the annular filter move toward the top plate of the diffuser shell during the actuation, the protrusion of the cylindrical wall surface of the retainer is abutted against the top plate of the diffuser shell, and the depression of the cylindrical wall surface of the retainer forms combustion gas passages.

The depression and the protrusion, formed at the circumferential edge of the cylindrical wall surface of the retainer in the top plate side of the diffuser shell, form a combustion gas passage during the actuation.

The depression and the protrusion are formed alternately in the circumferential direction, and a difference in height is created in the axial direction.

When the housing is deformed during the actuation, the protrusion of the cylindrical wall surface of the retainer abuts against the top plate of the diffuser shell, and a hole formed by the top plate and the depression serve as a combustion gas passage.

The protrusion thus prevents the retainer from moving further and protects the annular filter from being compressed excessively. Further, the gas passage in the depression is prevented from being closed.

A preferable feature 2 of the present invention provides a gas generator, wherein a cylindrical member is disposed within the housing such as to be press-fitted to the lower circumferential wall plate of the closure shell, and such that a gap is formed between the cylindrical member and the top plate of the diffuser shell and also between the cylindrical member and the gas discharge port provided in the upper circumferential wall plate, and the retainer is press-fitted and fixed to the cylindrical member.

The cylindrical member of the present invention is used when the retainer is indirectly press-fitted to the circumferential wall plate.

The cylindrical member is press-fitted and fixed to the circumferential wall plate, and the retainer is press-fitted and fixed to the cylindrical member. Therefore, mounting operation can be facilitated and it is possible to deal with changes such as increase or decrease in an amount of the gas generating agent or increase or decrease in a thickness of the annular filter.

By using the cylindrical member, a gas passage from the annular filter to the gas discharge port is secured and also abilities of collecting the combustion residues and cooling the gas is exhibited by collision of the combustion gas with the wall surface of the cylindrical member.

A preferable feature 3 of the present invention provides a gas generator, wherein the lower surface of the annular filter is supported by the annular bottom surface of the retainer, and the outer circumferential surface of the annular filter is supported by the cylindrical wall surface of the retainer, and the retainer has a through-hole in the inner circumferential edge side of the annular bottom surface facing the annular filter.

By forming the through-hole in the inner circumferential edge side of the annular bottom surface of the retainer, it is possible to cause the combustion gas to pass through not only the inner circumferential surface of the annular filter, but also the annular bottom surface of the retainer and obtain the gas inflow surface of the filter.

When the through-hole is formed in the inner circumferential edge side of the annular bottom surface of the retainer, the through-hole is preferably formed in the inner circumferential edge side with a width equal to or less than ½ of a width of the retainer, more preferably in the inner circumferential edge side with a width equal to or less than ⅓ of a width of the retainer.

A preferable feature 4 of the present invention provides a gas generator, wherein the inner circumferential surface of the annular filter is arranged to protrude toward the center axis of the housing beyond an inner circumferential edge of the annular bottom surface of the retainer.

In the annular filter arranged in the above manner, the portion protruding from the inner circumferential edge of the central hole of the retainer can serve as the inflow surface for the combustion gas during the actuation other than the portion supported by the retainer.

In particular, since the cup-shaped container is present, the inflow of gas is made difficult at the inner circumferential edge of the annular filter. However, with the above-described configuration, the gas can smoothly flow into the annular filter.

The gas generator in accordance with the present invention makes it possible to simplify an internal structure and an assembling process, prevent the short-passing of the combustion gas even when the housing is deformed by pressure during the actuation, and reduce the difference in output of the gas generator caused by the difference in the temperature during the actuation.

DESCRIPTION OF EMBODIMENTS (1) Gas Generator Shown in FIG. 1

An embodiment of a gas generator 1 in accordance with the present invention will be explained below with reference to (a) to (c) in FIG. 1.

A housing 10 is obtained by welding and integrating a diffuser shell 11 and a closure shell 21.

In (a) in FIG. 1, the contact portions are joined and integrated in a state in which an opening end of the closure shell 21 is inserted into an opening of the diffuser shell 11.

The diffuser shell 11 has a top plate 12 and an upper circumferential wall plate 13 formed with a gas discharge port 14.

The closure shell 21 has a bottom plate 22 and a lower circumferential wall plate 23.

The circumferential wall plate of the housing 10 is formed by the upper circumferential wall plate 13 and the lower circumferential wall plate 23. The joining is performed only at the abutment portion of the upper circumferential wall plate 13 and the lower circumferential wall plate 23.

Inside the housing 10, an ignition device chamber 30, defined by a cup-shaped container 31 accommodating an ignition device, is arranged in the central section of the closure shell bottom plate 22.

A known transfer charge or gas generating agent (not shown in the drawing) is accommodated inside the ignition device chamber 30, and a plurality of flame-transferring holes 31a is formed in a circumferential wall 32 of the cup-shaped container 31. The flame-transferring holes 31a are closed from the outside with a metallic sealing tape.

A flange portion 31b is formed at the opening of the cup-shaped container 31 and is fixed by welding to the bottom plate 22 of the closure shell 21.

The ignition device includes an electric igniter 35 and a collar 36 enclosing the electric igniter 35. The ignition device is inserted from the opening formed in the central portion at the bottom plate 22 of the closure shell.

In the ignition device, the collar 36 is supported and fixed by a tubular support wall portion 24 bent from the bottom plate 22 of the closure shell to form an opening in the central portion of the bottom plate 22 of the closure shell 21.

A cylindrical member 50 is disposed inside the housing 10. The cylindrical member 50 has a shape such that the outer diameter of a lower cylindrical wall portion 51 in the lower end side (in the bottom plate 22 side of the closure shell) is larger than the outer diameter of the upper cylindrical wall portion 52 in the upper end side (in the top plate 12 side of the diffuser shell).

The circumferential edge 52a at the opening of the upper cylindrical wall portion 52 of the cylindrical member 50 is expanded outward, whereby facilitating the insertion of a retainer 60.

The cylindrical member 50 is fixed such that the lower cylindrical wall portion 51 is press-fitted to the lower circumferential wall plate 23 of the closure shell 21, and that a gap, serving as a gas passage, is formed between the circumferential edge 52a at the opening of the upper cylindrical wall portion 52 and the top plate 12 of the diffuser shell 11. The gap serving as a gas passage may be of an annular shape or a comb-like shape such that the circumferential edge 52a of the opening includes a portion abutting against the top plate 12 of the diffuser shell and a portion that does not abut thereagainst. The abutting portion and the not-abutting portion are formed at predetermined intervals.

Further, a cylindrical space 53 is formed between the outer circumferential surface of the upper cylindrical wall portion 52 having a smaller outer diameter and the upper circumferential wall plate 13 including the gas discharge port 14.

A combustion chamber 40 is defined inside the cylindrical member 50 in the outside of the ignition device chamber 30, and a gas generating agent (not shown in the drawing) is charged into the combustion chamber 40.

For example, a gas generating agent with a low combustion temperature (for the combustion chamber 40) and a gas generating agent with a high combustion temperature (for the ignition device chamber 30), such as disclosed in JP-A No.

2005-199867, can be used as the gas generating agents used in the combustion chamber 40 and the ignition device chamber 30, respectively.

An annular filter 70 supported by the retainer 60 is disposed inside the housing 10.

The retainer 60 has an annular bottom surface 61 and a cylindrical wall surface 62 provided vertically at both sides from the outer circumferential edge of the annular bottom surface 61, that is, the cylindrical wall surface 62 extends in the top plate 12 side of the diffuser shell and the bottom plate 22 side of the closure shell.

The cylindrical wall surface 62 of the retainer 60 is press-fitted and fixed to the upper cylindrical wall portion 52 of the cylindrical member 50.

A depression-protrusion configuration including depressions 63a and protrusions 63b arranged alternately in the circumferential direction is formed at the circumferential edge of the cylindrical wall surface 62 in the side of the top plate 12 of the diffuser shell 11.

A plurality of through-holes 65 serving as passage ports for combustion gas are formed in the annular bottom surface 61 closer to the axis X (within a range of ⅓ of the width of the annular bottom surface 61 in the side of the axis X).

In the annular filter 70, an outer circumferential surface 71 and a lower surface 72 are supported by the cylindrical wall surface 62 and the annular bottom surface 61 of the retainer 60, respectively.

Before the gas generator is actuated, the upper surface 73 of the annular filter 70 protrudes upward beyond the protrusions 63b of the retainer 60, as shown in FIG. 1(*b*).

The annular filter 70 supported by the retainer 60 is disposed such that the bottom surface 33 of the cup-shaped container 31 is abutted against the top plate 12 of the diffuser shell (is not fixed to the top plate 12), and the circumferential wall 32 in the vicinity of the bottom surface 33 is abutted (is not attached tightly) to the inner circumferential surface 74 of the annular filter 70. The upper surface 73 of the annular filter 70 and the top plate 12 abut against each other.

The inner diameter of the annular filter 70 and the outer diameter of the cup-shaped container 31 are adjusted to be almost equal to each other. The inner diameter of the annular bottom surface 61 of the retainer 60 is slightly larger than the outer diameter of the circumferential wall 32 of the cup-shaped container 31, and the retainer 61 is press-fitted to the cylindrical member 50 so that the annular bottom surface 61 surrounds the cup-shaped container 31.

An example of a method for assembling the gas generator 1 will be explained below.

The lower cylindrical wall portion 51 of the cylindrical member 50 is press-fitted and fixed to the lower circumferential wall plate 23 of the closure shell 21 that includes the ignition device (cup-shaped container 31) fixed thereto.

A predetermined amount of the gas generating agent is charged.

The retainer 60 is press-fitted and fixed from the upper cylindrical wall portion 52 (the circumferential edge 52a of the opening) side of the cylindrical member 50.

The annular filter 70 is inserted into the retainer 60 and the cup-shaped container 31.

After the diffuser shell 11 and the closure shell 21 have been assembled, the contact portion (the abutment portion of the upper circumferential wall plate 13 and the lower circumferential wall plate 23) are welded and fixed.

The operation of the gas generator 1 will be explained below.

Where the igniter 35 is actuated, the gas generating agent in the ignition device chamber 30 is ignited and burned, thereby generating the combustion gas to be released from the flame-transferring holes 31a into the combustion chamber 40.

When the gas generating agent inside the combustion chamber 40 is thereby ignited and burned to generate the combustion gas, a load is applied by the internal pressure in both directions along the axis X, as shown by the white arrows in (c) in FIG. 1. As a result, the housing 10 is deformed such that the top plate 12 and the bottom plate 22 move away from each other.

Since the housing 10 is welded only in the opening portions of the diffuser shell 11 and the closure shell 21, the top plate 12 undergoes the largest deformation at the axis X portion (the central portion of the top plate).

Further, since the cup-shaped container 31 is welded and fixed to the bottom plate 22, the bottom surface 33 moves away from the top plate 12.

Under the effect of the pressure inside the combustion chamber 40, the retainer bottom surface 61 is deformed, while pushing the lower surface 72 of the annular filter 70 towards the top plate 12. Therefore, it is possible to prevent short-passing of the combustion gas between the retainer 60 and the annular filter 70 and between the annular filter 70 and the top plate 12.

Meanwhile, the cylindrical wall surface 62 of the retainer hit the top plate 12, but in this case subsequent movement is blocked by the protrusions 63b hitting the top plate 12. Therefore, combustion gas passages formed by the depressions 63a is ensured between the cylindrical wall surface 62 of the retainer and the top plate 12.

Further, since the annular filter 70 is deformed in a state of being pressed against the top plate 12, short-passing of the combustion gas between the top plate 12 and the upper surface 73 of annular filter can be also prevented.

The inner circumferential surface 74 of the annular filter 70 that faces the circumferential wall 32 of the cup-shaped container 31 is exposed during the actuation, and the annular bottom surface 61 of the retainer has the through-hole 65. Therefore, the combustion gas flows as shown by the arrow in (c) in FIG. 1 and passes through the entire region of the annular filter 70.

After the combustion gas has thereafter passed through the cylindrical space 53 (the combustion gas passage) defined by the circumferential wall plate of the hosing and the cylindrical member 50, the combustion gas is discharged from the gas discharge port 14. In this process, the combustion gas collides with the cylindrical member 50 or the upper circumferential wall plate 13. As a result, the effect of arresting the combustion residues and the effect of cooling the gas are increased and, therefore, the annular filter 70 can be miniaturized.

In addition, since the inner circumferential surface 74 of the annular filter 70 hidden before the actuation emerges and becomes a gas inflow surface, the contact surface area of the combustion gas and the filter increases and the cooling efficiency and filtering efficiency of the combustion gas are increased.

The inner pressure during actuation of the gas generator depends on the ambient temperature, and where the temperature is high, the combustion of the gas generating agent is more activated and the output rises even if the specifications of the gas generator are unchanged. If the combustion is thus activated and the inner pressure is increased (the degree of deformation of the housing 10 is increased) in the gas generator shown in FIG. 1, the gas inflow surface of the filter increases. Therefore, the cooling efficiency increases and the output difference of the gas generators in the ambient temperatures can be suppressed.

Figure 2:
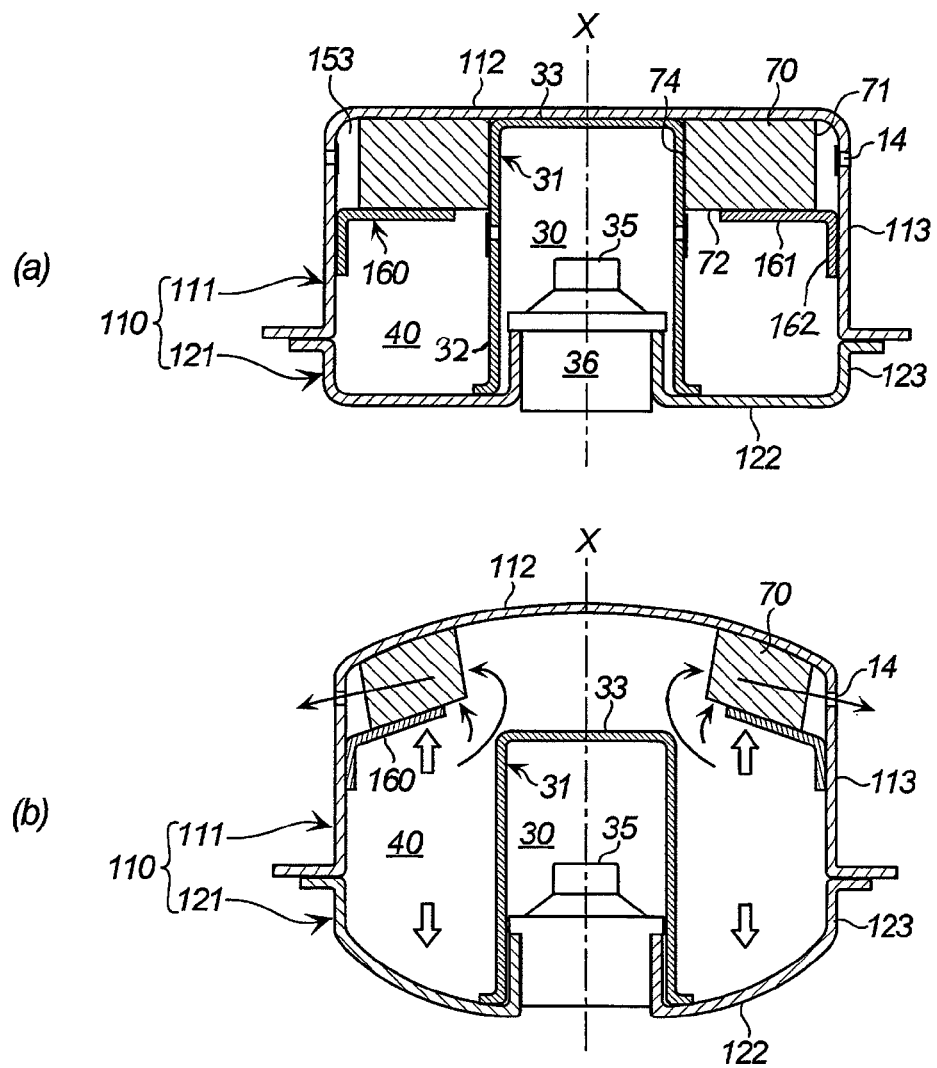
FIG. 2 shows, in (a), a cross-sectional view along the axis X of the gas generator of another embodiment before the actuation, and, in (b), a state after the actuation of the gas generator shown in (a).

(2) Gas Generator Shown in FIG. 2

The gas generator shown in (a) in FIG. 2 is substantially identical to the gas generator shown in (a) in FIG. 1, except for a shape of the housing, a shape of the retainer and an arrangement state of the annular filter. Therefore, the explanation below is focused on the difference between the two gas generators.

In a housing 110, the length of an upper circumferential wall plate 113 of a diffuser shell 111 is larger than the length of a lower circumferential wall plate 123 of a closure shell 121.

In the upper circumferential wall plate 113, the gas discharge port 14 is formed at a position close to a top plate 112 of the diffuser shell 111.

A retainer 160 has an annular bottom surface 161 and a cylindrical wall surface 162 formed by bending at the outer circumferential edge of the annular bottom surface 161 toward the bottom plate 122.

The retainer 160 is fixed such that the cylindrical wall surface 162 is press-fitted to the upper circumferential wall plate 113 of the diffuser shell 111.

The annular filter 70 identical to that shown in (a) in FIG. 1 can be used in this embodiment, but the inner circumferential surface 74 of the annular filter 70 is disposed so as to protrude from the annular bottom surface 161 of the retainer toward the axis X side (the center), i.e. the inner circumferential surface 74 further protrudes inside than the inner circumferential edge of the retainer 160). In other words, in the gas generator shown in FIG. 2, the inner diameter of the annular bottom surface 161 of the retainer 160 is larger than the outer diameter of the circumferential wall 32 of the cup-shaped container 31, and is larger than the inner diameter of the annular bottom surface 61 in FIG. 1. Further, an annular gap is formed between the annular bottom surface 161 and the circumferential wall 32 of the cup-shaped container 31.

A cylindrical space 153 is formed between the outer circumferential surface 71 of the annular filter 70 and the diffuser shell 111, and this space serves as a combustion gas passage.

The gas generator shown in (a) in FIG. 2 can be assembled in the same manner as the gas generator shown in (a) in FIG. 1. The annular filter 70 can be easily positioned by being inserted into the cup-shaped container 31.

The operation of the gas generator shown in (a) in FIG. 2 is the same as that of the gas generator shown in (a) in FIG. 1, some difference in the operation being caused by the difference in shapes of the housing 110 and the retainer 160.

Under the effect of pressure created by the actuation, the gas generator shown in (a) in FIG. 2 is deformed as shown in (b) in FIG. 2.

The rectangular cross-sectional shape of the annular filter 70 shown in (a) in FIG. 2 changes to a cross-sectional shape close to a parallelogram shown in (b) in FIG. 2. This is because the annular filter 70 deforms such that the inner circumferential surface 74 that has faced the cup-shaped container 31 is exposed above the bottom surface 33 as shown in FIG. 2(b). As a result, the gas inflow surface area is increased. Further, since the annular filter 70 is deformed to such a cross-sectional shape, the internal gas passage distance within the annular filter 70 can be also increased and therefore the filtration performance is improved.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a housing including,
a diffuser shell having a top plate and an upper circumferential wall plate provided with a gas discharge port, and
a closure shell having a bottom plate and a lower circumferential wall plate, the diffuser shell and the closure shell
forming an outer shell of the gas generator by joining and integrating the upper circumferential wall plate and the lower circumferential wall plate;
an ignition device chamber provided within the outer shell and defined by a cup-shaped container disposed in a central part at the bottom plate of the closure shell, and accommodates an ignition device therein;
a combustion chamber surrounding the ignition device chamber and charged with a gas generating agent;
an annular filter disposed to face the top plate;
a retainer supporting the annular filter and including,
an annular bottom surface supporting at least a portion of a lower surface of the annular filter, and
a cylindrical wall surface extending at least in an axial direction of the housing from an outer circumferential edge of the annular bottom surface, the cylindrical wall surface being fixed by being press-fitted directly or indirectly to a circumferential wall plate formed by the upper circumferential wall plate and the lower circumferential wall plate;
a combustion gas passage formed to pass through from an outer circumferential surface of the filter to the gas discharge port; and
the cup-shaped container being disposed such that a bottom surface thereof abutting against or being positioned close to the top plate of the diffuser shell, a circumferential wall thereof in the vicinity of the bottom surface abutting against or being positioned close to an inner circumferential surface of the annular filter,
wherein, during an activation of the gas generator,
when the top plate of the diffuser shell and the bottom plate of the closure shell deform in directions along an axis of the housing, the retainer and the annular filter move such that the annular filter is in gas-tight contact with the top plate of the diffuser shell, and a combustion gas passes through the combustion gas passage to be discharged from the gas discharge port after passing radially outward through the annular filter.

2. The gas generator according to claim 1, wherein
the cylindrical wall surface of the retainer extends toward the top plate of the diffuser shell, and a depression and a protrusion are provided in the circumferential direction at a circumferential edge thereof,
during the activation of the gas generator, when the top plate of the diffuser shell and the bottom plate of the closure shell deform in directions along an axis of the housing, the retainer and the annular filter move toward the top plate of the diffuser shell, and
the protrusion of the cylindrical wall surface of the retainer is abutted against the top plate of the diffuser shell, and the depression of the cylindrical wall surface of the retainer forms combustion gas passages.

3. The gas generator according to claim 1, further comprising:
a cylindrical member disposed within the housing such as to be press-fitted to the lower circumferential wall plate of the closure shell, and such that a gap is formed between the cylindrical member and the top plate of the diffuser shell and also between the cylindrical member and the gas discharge port provided in the upper circumferential wall plate,
wherein the retainer is press-fitted and fixed to the cylindrical member.

4. The gas generator according to claim 1, wherein
the lower surface of the annular filter is supported by the annular bottom surface of the retainer, and the outer circumferential surface of the annular filter is supported by the cylindrical wall surface of the retainer, and
the retainer has a through-hole in the inner circumferential edge side of the annular bottom surface facing the annular filter.

5. The gas generator according to claim 1, wherein
the inner circumferential surface of the annular filter protrudes toward the center axis of the housing beyond an inner circumferential edge of the annular bottom surface of the retainer.

6. A gas generator according to claim 1, wherein, during the activation of the gas generator, the top plate and the bottom plate deform in the directions along the axis of the housing, and the retainer and the annular filter move such that the annular filter is in gas-tight contact with the top plate and the inner circumferential surface of the annular filter faces a space between the bottom surface of the cup-shaped container and the top plate of the diffuser shell.

7. A gas generator according to claim 3, wherein a lower portion of the cylindrical member has a first outer diameter and an upper portion of the cylindrical member has a second outer diameter smaller than the first outer diameter, and the cylindrical member is provided such that the lower portion is press-fitted to the lower circumferential wall plate of the closure shell, and the cylindrical wall surface of the retainer is press-fitted to the upper portion.

8. A gas generator according to claim 2, wherein an upper surface of the annular filter protrudes upward beyond the protrusion of the retainer, before actuation.

9. A gas generator, comprising:
a housing including a top plate, a bottom plate, and a circumferential wall connecting the top plate and the bottom plate;
a cup-shaped container defining therein an ignition device chamber and being provided in a central portion within the housing such that an open end of the cup-shaped container is fixed to the bottom plate and the bottom surface is not fixed to the top wall;
an annular filter disposed to face the top plate such that before an activation of the gas generator, an inner cylindrical surface of the annular filter abuts against a circumferential wall of the cup-shaped container; and
a retainer provided within the housing for supporting the annular filter and defining a combustion chamber therebelow for accommodating a gas generating agent, the retainer including, an annular bottom surface supporting a portion of a lower surface of the annular filter and provided such that the remaining portion of the lower surface of the annular filter faces the combustion chamber, and
a cylindrical wall surface extending at least in a axial direction of the housing from an outer circumferential edge of the annular bottom surface, the cylindrical wall surface being fixed directly or indirectly to the circumferential wall of the housing,
during the activation of the gas generator, the top plate and the bottom plate deform in directions along an axis of the housing, the retainer and the annular filter moving such that the annular filter is in gas-tight contact with the top plate and a first gap is formed between the bottom surface of the cup-shaped container and the top plate so as for the inner circumferential surface of the annular filter to face the first gap.

10. A gas generator according to claim 9, further comprising:
a cylindrical member disposed within the housing so as to be press-fitted to a lower portion of the circumferential wall of the housing such that a second gap is formed between the cylindrical member and the top plate of the housing and a third gap is formed between the cylindrical member and the circumferential wall of the housing,
wherein the retainer is press-fitted and fixed to the cylindrical member.

11. A gas generator according to claim 10, wherein a lower portion of the cylindrical member has a first outer diameter, and an upper of the cylindrical member has a second outer diameter smaller than the first outer diameter, and the cylindrical member is provided such that the lower portion is press-fitted to the lower portion of the circumferential wall of the housing, and the cylindrical wall surface of the retainer is press-fitted to the upper portion.

12. A gas generator according to claim 9,
wherein, prior to the activation of the gas generator, the cylindrical wall surface of the retainer includes a depression and a protrusion provided in a circumferential direction at a circumferential edge thereof, and an upper surface of the annular filter protrudes upward beyond the protrusion of the retainer, and
wherein the annular filter and the retainer are provided such that when the housing is deformed and the retainer and the annular filter moves toward the top plate of the housing, the protrusion of the cylindrical wall surface of the retainer abuts against the top plate of the housing, and the depression of the cylindrical wall surface of the retainer forms a combustion gas passage.

* * * * *